US007096152B1

United States Patent
Ong

(10) Patent No.: US 7,096,152 B1
(45) Date of Patent: Aug. 22, 2006

(54) METHOD AND APPARATUS FOR DETERMINING WEIGHT OF MOVING MAILPIECES

(75) Inventor: Henson C. Ong, Waterbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/185,663

(22) Filed: Jul. 20, 2005

(51) Int. Cl.
G01G 7/00 (2006.01)
G01G 9/00 (2006.01)
G01G 11/00 (2006.01)
G01G 17/00 (2006.01)
G01G 19/00 (2006.01)

(52) U.S. Cl. .................. 702/173; 700/305; 705/407
(58) Field of Classification Search ................. 702/173
See application file for complete search history.

(56) References Cited

U.S. PATENT DOCUMENTS 3,890,492 A * 6/1975 Manduley et al. .......... 705/407

6,675,065 B1 * 1/2004 Foth et al. .................. 700/227

* cited by examiner

Primary Examiner—John Barlow
Assistant Examiner—Sujoy Kundu
(74) Attorney, Agent, or Firm—Michael J. Cummings; Steven J. Shapiro; Angelo N. Charles

(57) ABSTRACT

The invention pertains to a mailpiece weight measuring apparatus for use with a high speed automatic mailpiece processing system. The weight measuring apparatus measures the inertial mass of the mailpiece as the weight equivalent. The apparatus includes a device for determining a first velocity of a mailpiece, a device for imparting a force to the mailpiece in a direction co-linear with the first velocity so that the mailpiece exits said force impacting device at a second velocity, a device for determining the second velocity of the mailpiece, a device for determining a change in a parameter proportional to the force imparted on the mailpiece, and a device for determining the weight of the mailpiece based upon the determined first velocity, second velocity and change in the parameter.

5 Claims, 9 Drawing Sheets

Mailpiece

METHOD AND APPARATUS FOR DETERMINING WEIGHT OF MOVING MAILPIECES

BACKGROUND OF THE INVENTION

The present invention generally pertains to mailpiece processing. More specifically, the present invention relates to determining the weight of the mailpieces in automated mail handling equipment.

BACKGROUND ART

The processing and handling of mailpieces consumes an enormous amount of human and financial resources. For many businesses, various pieces of mail generated by a plurality of sources need to be addressed, collected, sorted, weighted and franked as part of the outgoing mail process.

Automated mail handling equipment is known in the art. Mailing systems such as the Pitney Bowes DM1000™ can process uniform, single weight mailpieces at speeds up to 260 pieces per minute and non-uniform, mixed-weight mailpieces at speeds up to 130 pieces per minute. In such a system, each mailpiece is weighed and postage is calculated and imprinted onto the envelope in a single operation.

At such a high processing speed, the device within the mail handling system for weighing the mailpieces has a relatively short time period in which to perform its function. The common method used for weighting the mailpieces is a weight-on-the-fly (WOF) method, which means the device basically comprises a calibrated scale on a belt transport.

It is well known that a mechanical scale for weighting moving objects is highly susceptible to vibration effects, aerodynamic uplift/down-force of an airfoil in horizontal motion, and other environmental factors that introduce spurious noise into the measurement. For reducing the inaccuracy, a typical weight-sensing load cell requires a minimum settling time between weightings. Such time delay limits the speed of a mail processing system.

Therefore, what is needed is a device that determines weight of high speed moving mailpieces with high accuracy. Such a device should have greater immunity from vibration and other factors that contribute to the weight determination inaccuracies.

SUMMARY OF THE INVENTION

The invention pertains to a mailpiece weight measuring apparatus for use with a high-speed automatic mailpiece processing system. The weight measuring apparatus measures the inertial mass of the mailpiece as the weight equivalent. The apparatus includes a device for determining a first velocity of a mailpiece, a device for imparting a force to the mailpiece in a direction co-linear with the first velocity so that the mailpiece exits said force impacting device at a second velocity, a device for determining the second velocity of the mailpiece, a device for determining a change in a parameter proportional to the force imparted on the mailpiece, and a device for determining the weight of the mailpiece based upon the determined first velocity, second velocity and change in the parameter.

In the preferred embodiment, the force imparting device comprises a first roller and a second roller positioned relative to each other so that a mailpiece is pinched between the rollers when it travels between them. The device for determining a change in a parameter ($\Delta p$) comprises a logical device in communication with a rotational encoder monitoring the first roller. The logical device is capable of deriving a change of angular velocity of the first roller based on signals from the rotational encoder.

In another preferred embodiment, the force imparting means comprises an elongate object having a first end and a second end. The first end is pivotally fastened at a location remote from a path that the mailpieces travel. The second end is attached to a flat plate. The flat plate is positioned perpendicular to the path when the elongate object is in a first position. So that a mailpiece travels along its path would impact the plate and angularly displace the elongate object from the first position. The means for determining a change in a parameter ($\Delta p$) comprising a device that is capable of determining a displacement angle ($\Delta \theta$) of the elongated object from its first position to its displaced position after the impact with the mailpiece.

The invention also pertains to a method for measuring mailpiece weight. The method comprises the steps of determining a first velocity ($V_1$) of a mailpiece; imparting a force to the mailpiece in a direction co-linear with the first velocity, so that the mailpiece acquires a second velocity ($V_2$); determining the second velocity of the mailpiece; determining a change in a parameter ($\Delta p$) that is proportional to the force imparted to the mailpiece; and determining the weight of the mailpiece based upon the determined first velocity, second velocity and the change in the parameter.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Weight of a moving mailpiece can be determined by determining its inertial mass (m), which is independent of gravity, by an inertial mass-on-the-fly (IMOF) method. In principle, the inertial mass of an object is found by applying a known force (F) to the object, measuring the acceleration (a), and applying Newton's Second Law:

$$m = \frac{F}{a} \quad (1)$$

Figure 1:
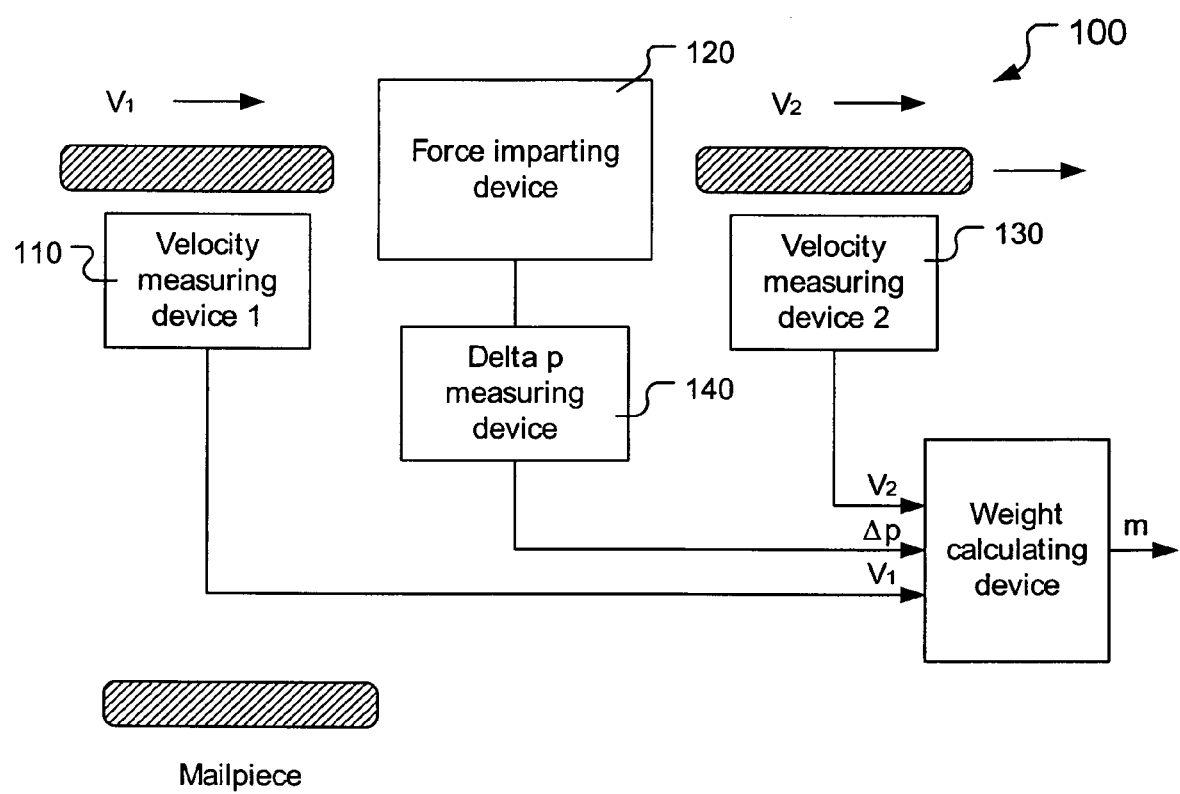
FIG. 1 is a block diagram of the weight measuring apparatus according to the invention.

The IMOF device of the present invention determines inertial mass of a projectile (mailpiece) by measuring a change in linear velocity of the mailpiece under a deceleration force. The weight of the mailpiece is equivalent to its inertial mass. FIG. 1 shows a general block diagram of an IMOF device. A mailpiece carried by a transport mechanism (such as paired driving wheels on a platform) enters the IMOF device 100. The velocity of the mailpiece ($V_1$) at the entry point is determined by a first velocity measuring device 110 or is set by the transporting means. The mailpiece encounters an object in a force imparting device 120 and is decelerated by it. The mailpiece thus exits the force imparting device 120 with an exiting velocity. The exiting velocity $V_2$ is measured by a second velocity measuring device 130. With the velocities of the mailpiece known, Newton's Second Law of equation (1) becomes:

$$m = \frac{F}{a} = \frac{F}{\frac{\Delta v}{\Delta t}} = \frac{F \Delta t}{\Delta v} = \frac{J}{V_1 - V_2} \quad (2)$$

where $\Delta t$ is the time interval that the imparting force acting on the mailpiece and J is the impulse.

The mailpiece's impulse of force J acting on the object of the force imparting device 120 results in a change in a physical parameter of the force imparting device. Such change is proportional to the impulse J. Therefore, $$m = \frac{f}{a} = \frac{J}{V_1 - V_2} \propto \frac{\Delta p}{V_1 - V_2} \quad (3)$$

A measuring device 140 determines the change of the physical parameter $\Delta p$. The inertial mass (m) or the weight of the mailpiece is determined according to the equation (3) and a calibration value that is dependent upon the configuration of the force imparting device, and the result is output by a weight calculating device 150 for calculating e.g. the postage of the mailpiece.

The change of a physical parameter of the force imparting device and its relationship to the inertial mass of the mailpiece is illustrated by the following examples:

(1) The object in the force imparting device changes its linear momentum after colliding with the mailpiece. The change is the negative of the change of momentum of the mailpiece times a friction factor k ($0 \leq k \leq 1$, k=1 if the collision is elastic). Therefore, the inertial mass (m) of the mailpiece can be expressed as:

$$m = \frac{J}{V_1 - V_2} = k \frac{m'(v'_2 - v'_1)}{V_1 - V_2} \propto \frac{v'_2 - v'_1}{V_1 - V_2} = \frac{\Delta v'}{V_1 - V_2} \quad (4)$$

where m is the inertial mass of the object, $v'_1$ and $v'_2$ are linear velocities of the object before and after the interaction, respectively.

(2) A rotating object in the force imparting device changes its angular momentum after interaction with the mailpiece. The change equals the negative of the change of linear momentum of the mailpiece times a friction factor k. Therefore, the inertial mass of the mailpiece can be expressed as:

$$m = \frac{J}{V_1 - V_2} = k \frac{I(\omega_2 - \omega_1)r}{V_1 - V_2} \propto \frac{(\omega_2 - \omega_1)r}{V_1 - V_2} = \frac{\Delta \omega \cdot r}{V_1 - V_2} \quad (5)$$

where I is the moment of inertia of the rotating object, r is the radius of same, and $\omega_1$ and $\omega_2$ are angular velocities of the rotating object before and after the interaction, respectively.

(3) The mailpiece loses or gains kinetic energy as the result of interaction with the force imparting device. The change of the kinetic energy $\Delta E$ is the following:

$$\Delta E = \frac{1}{2}mV_1^2 - \frac{1}{2}mV_2^2 = \frac{1}{2}m(V_1^2 - V_2^2) \quad (6)$$

$\Delta E$ is transferred to the object in the force imparting device. When the object returns to its original state, the change of energy is converted to a change of a measurable physical parameter $\Delta p$ of the force imparting device. Hence, $$\Delta E = \frac{1}{2}m(V_1^2 - V_2^2) \propto \Delta p \quad (7)$$

and $$m \propto \frac{\Delta p}{V_1^2 - V_2^2} \quad (8)$$

The parameter change $\Delta p$ can take various measurable forms, such as a voltage or current across a charging device, or a change in frequency of an oscillating circuit.

Finally, to calculate the inertial mass of the mailpiece, it is necessary to calibrate the IMOF device 100 using test masses to set scalar values for algorithmic comparison against an empirically derived table showing the m vs. $\Delta p$ curve.

Shown in the following, by way of examples, are some embodiments of the invention.

First and Preferred Embodiment of the Invention

Figure 2:
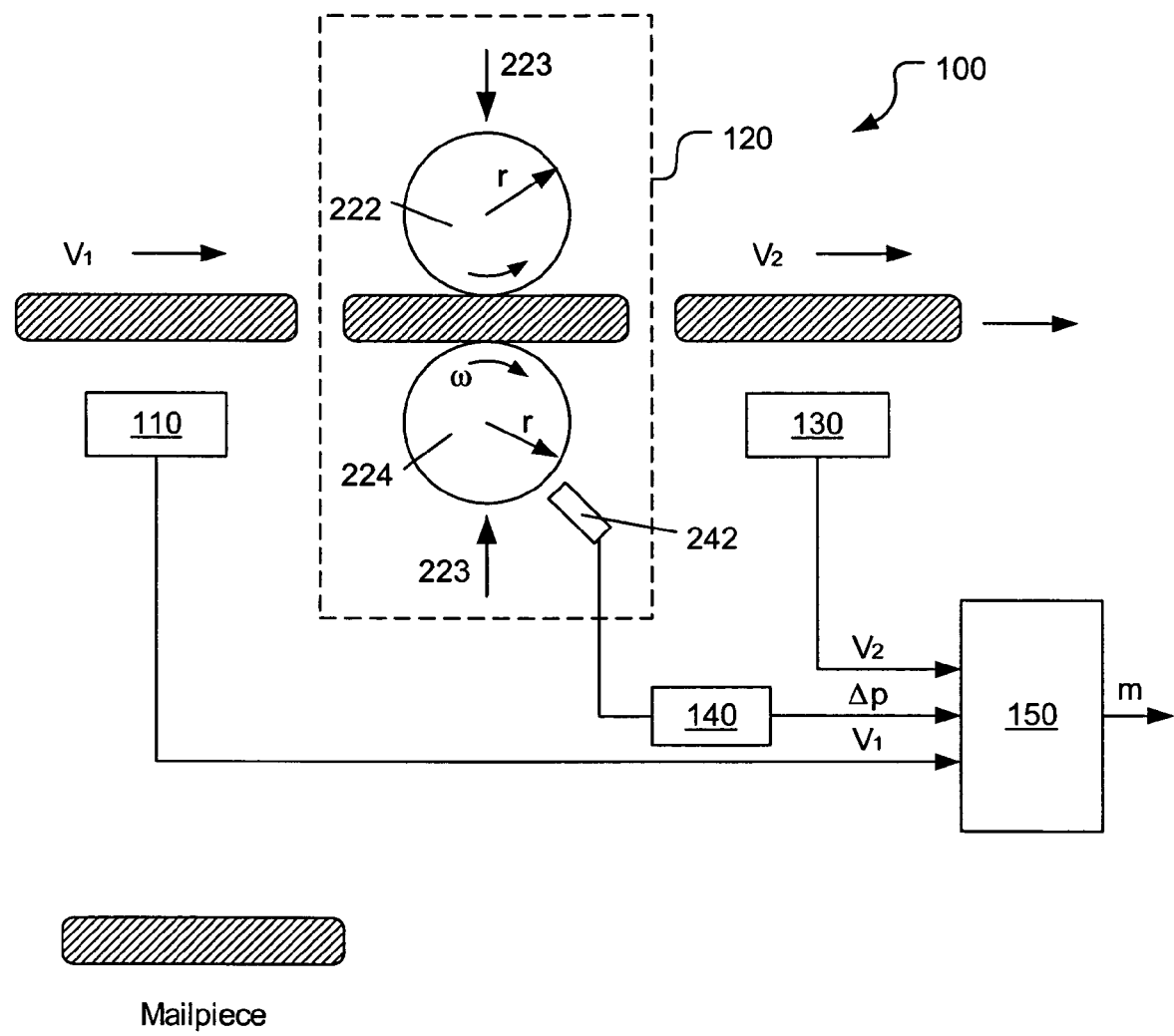
FIG. 2 is a schematic drawing of a first embodiment of the invention.

The first and preferred embodiment of the invention is shown in FIG. 2. The force imparting device 120 comprises a first roller 224 having a radius r and a second roller 222 that has substantially the same dimensions and characteristics as the first roller. The first and second rollers are preferably urged toward each other as shown by arrows 223 so as to automatically accommodate mailpieces of different thickness. This urging of the rollers toward each other can be performed by springs (not shown) or other techniques well known in the art.

The first roller 224 is rotating at an angular velocity $\omega_1$. This angular velocity is monitored by a rotational encoder 242 that is in communication with the $\Delta p$ measuring device 140. A mailpiece with a first linear velocity $V_1$ enters the gap between the rollers and is pinched by the rollers. The mailpiece travels between the rollers and leaves the rollers with a second linear velocity $V_2$. The first roller 224 changes its angular velocity to $\omega_2$ (in an ideal elastic collision, $V_2 = r \times \omega_2$).

The second linear velocity $V_2$ of the mailpiece can be derived either by applying the relationship $V_2 = r \times \omega_2$ or by direct measurement using the second velocity measuring device 130. The weight calculating device 150 takes the $V_1$, $V_2$ and $\Delta\omega (= \omega_2 - \omega_1)$ as input and calculates the inertial mass m of the mailpiece by applying the equation (5) and using a calibration curve of known masses.

Second Embodiment of the Invention

Figure 3:
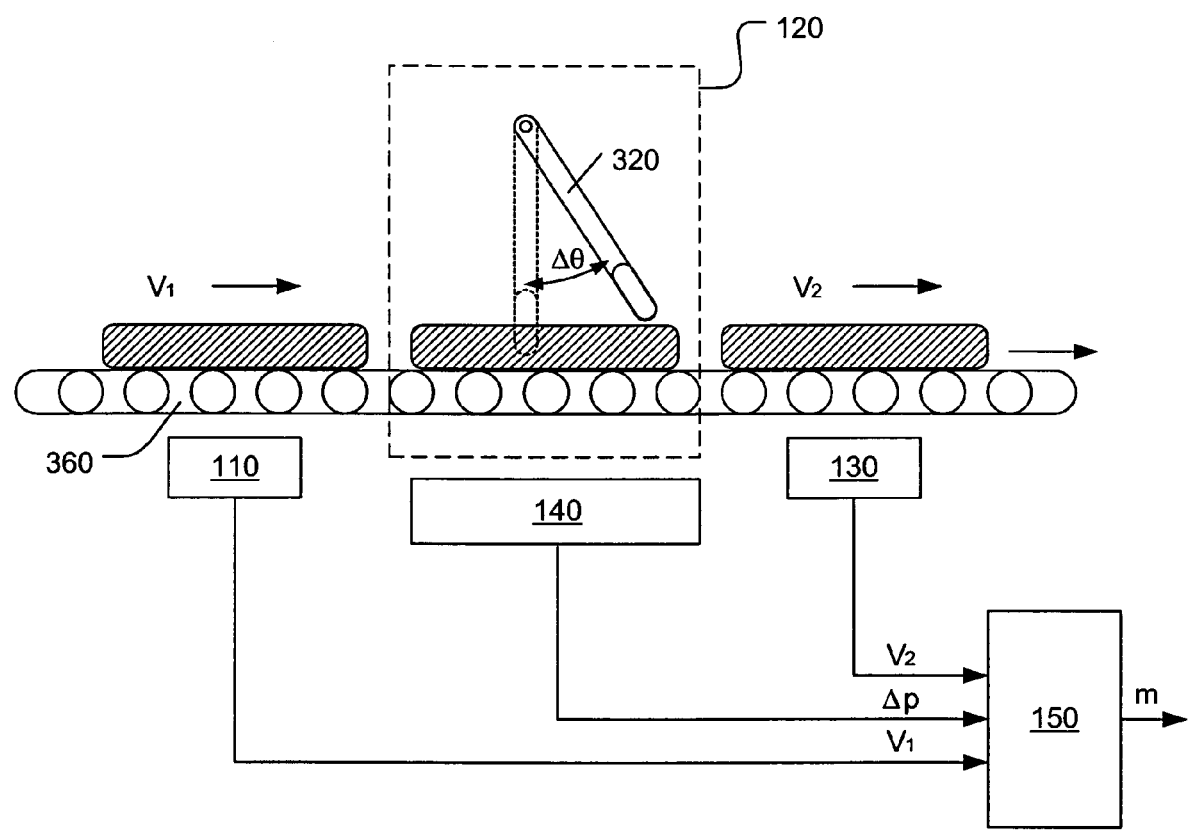
FIG. 3 is a schematic drawing of a second embodiment of the invention.

The second embodiment of the invention is shown in FIG. 3. The force imparting device 120 comprises a barrier object such as a lever 320 that is pivotally fastened at one end and is angualarly displaceable by the impact of the mailpiece at the another end. The mailpiece is traveling at a predetermined velocity $V_1$ on a transport means 360 when entering the force imparting device 120. The mailpiece transfers some of its kinetic energy to the lever 320 upon the impact, and the lever is displaced by an angle $\Delta\theta$ before returning to its original position. The displacement angle $\Delta\theta$ is measurable by the measuring means 140.

The displacement angle $\Delta\theta$ is proportional to inertial mass m of the mailpiece and one can apply equation (7) and using a calibration curve of known masses to derive the mass.

Figure 4:
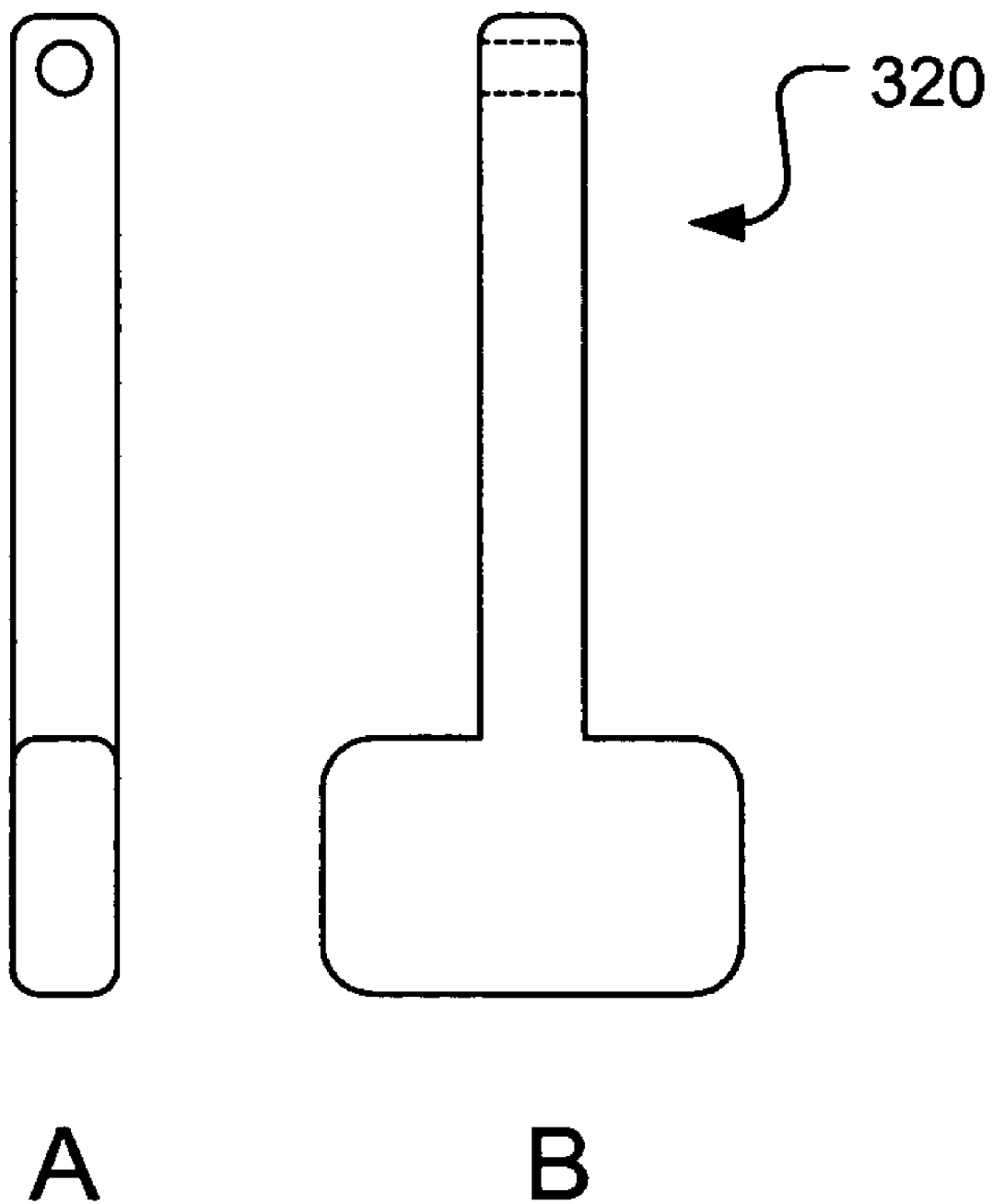
FIGS. 4A and 4B are side and front views, respectively, of the suspended lever used in the second embodiment of the invention.

Preferably, the lever comprises an elongated portion and a wide flat plate mounted at the end of the elongated portion. This is to spread the impact footprint such that point forces on the mailpiece are minimized. FIG. 4 shows an example of such lever.

Likewise preferably, the lever is coupled with a dampening mechanism that prevents the lever from immediately bouncing back after the collision with the mailpiece and swinging motion of the lever.

Preferred Embodiments for High-Density Mail Flows

In the situations where the mailpieces are traveling at a very high velocity and there is a very short distance between mailpieces, i.e. where a high-density mail flow is present, a modification to the IMOF device is preferred.

Figure 5:
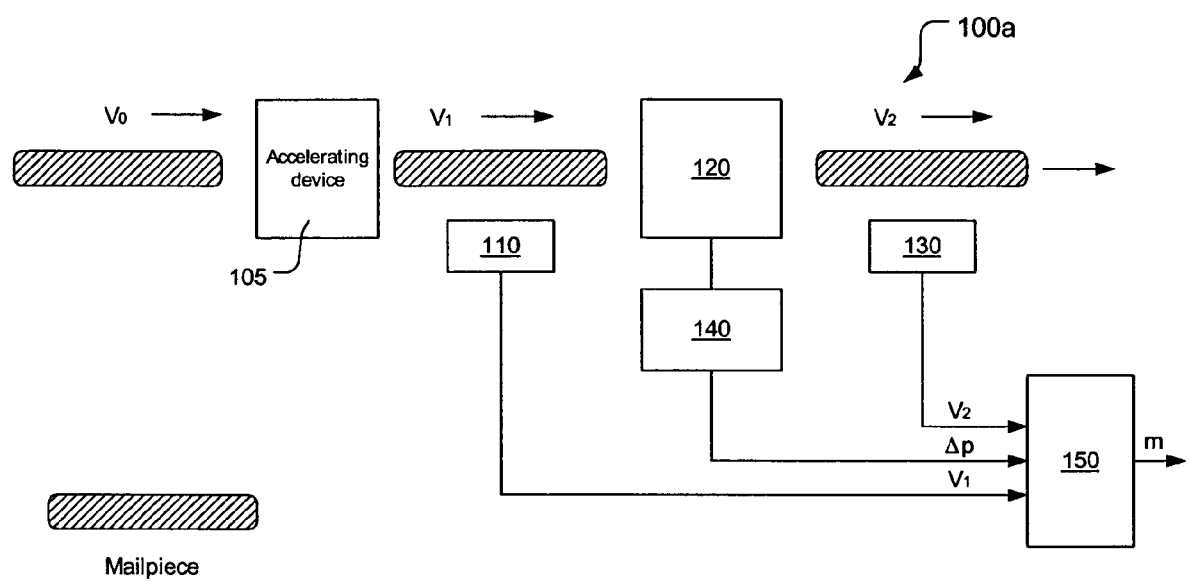
FIG. 5 is a block diagram of the weight measuring apparatus according to the invention, for use with high-density mail flow.

Referring now to FIG. 5, if the mail flow is dense, when a mailpiece arrives at the IMOF device, it is at risk of colliding with a previous mailpiece in front of it, if the force imparting device decelerates the previous mailpiece significantly. In order to reduce the likelihood of collision, an accelerating device 105 is added before the force imparting device 120 to accelerate the mailpiece from its initial velocity $V_0$ to a higher velocity $V_1$. After traveling through the force imparting device 120, the exiting velocity $V_2$ of the mailpiece should be close to its initial velocity $V_0$, thus reducing the likelihood of jam.

Figure 6:
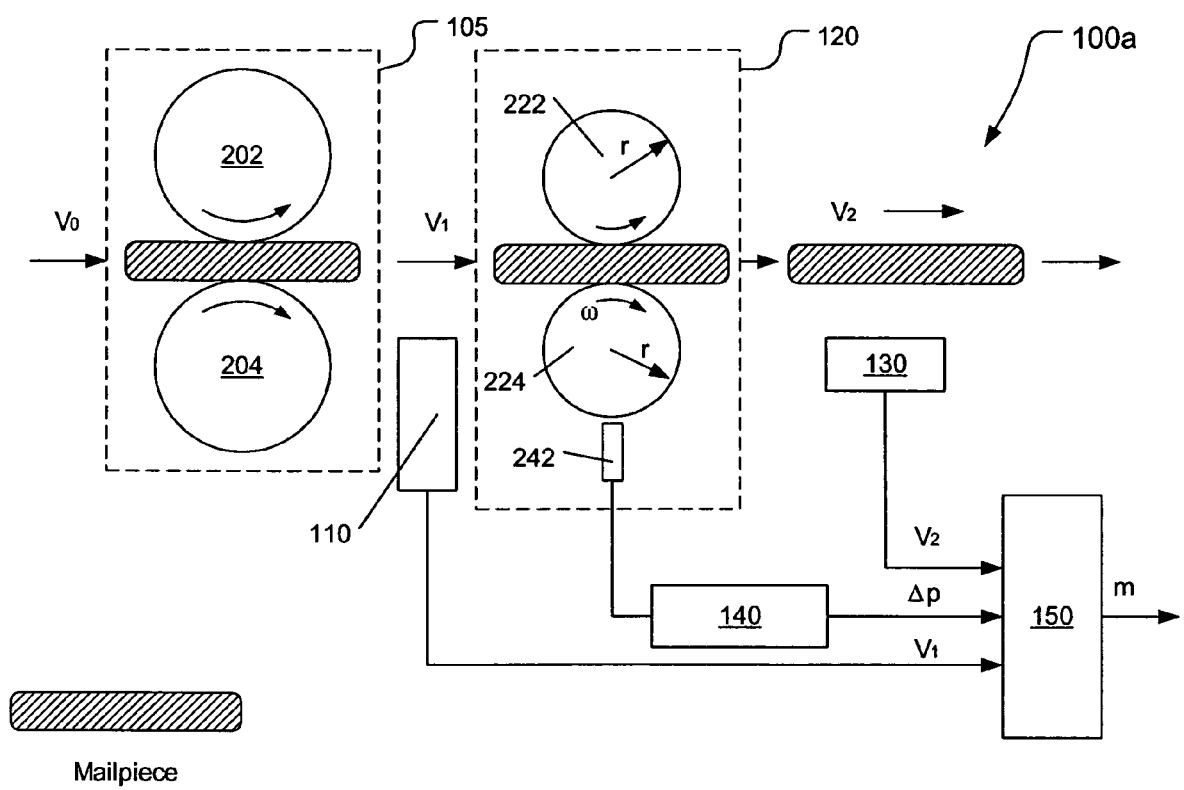
FIG. 6 is a schematic drawing of the first embodiment of the invention, adapted for use with high-density mail flow.

FIG. 6 shows one example of an IMOF device 100a that includes an accelerating device 105 and incorporates the first embodiment of the invention. The mailpiece, traveling at an initial velocity $V_0$, is accelerated to a first velocity $V_1$ by an accelerating device 105 comprising a pair of powered rollers 202 and 204. The mailpiece, with the first velocity $V_1$, then travels through the force imparting device 120 comprising a pair of unpowered rollers 222, 224. The inertial mass of the mailpiece is calculated by the weight calculating device 150 in the above-described manner.

Modification to the First Embodiment of the Invention

Figure 7:
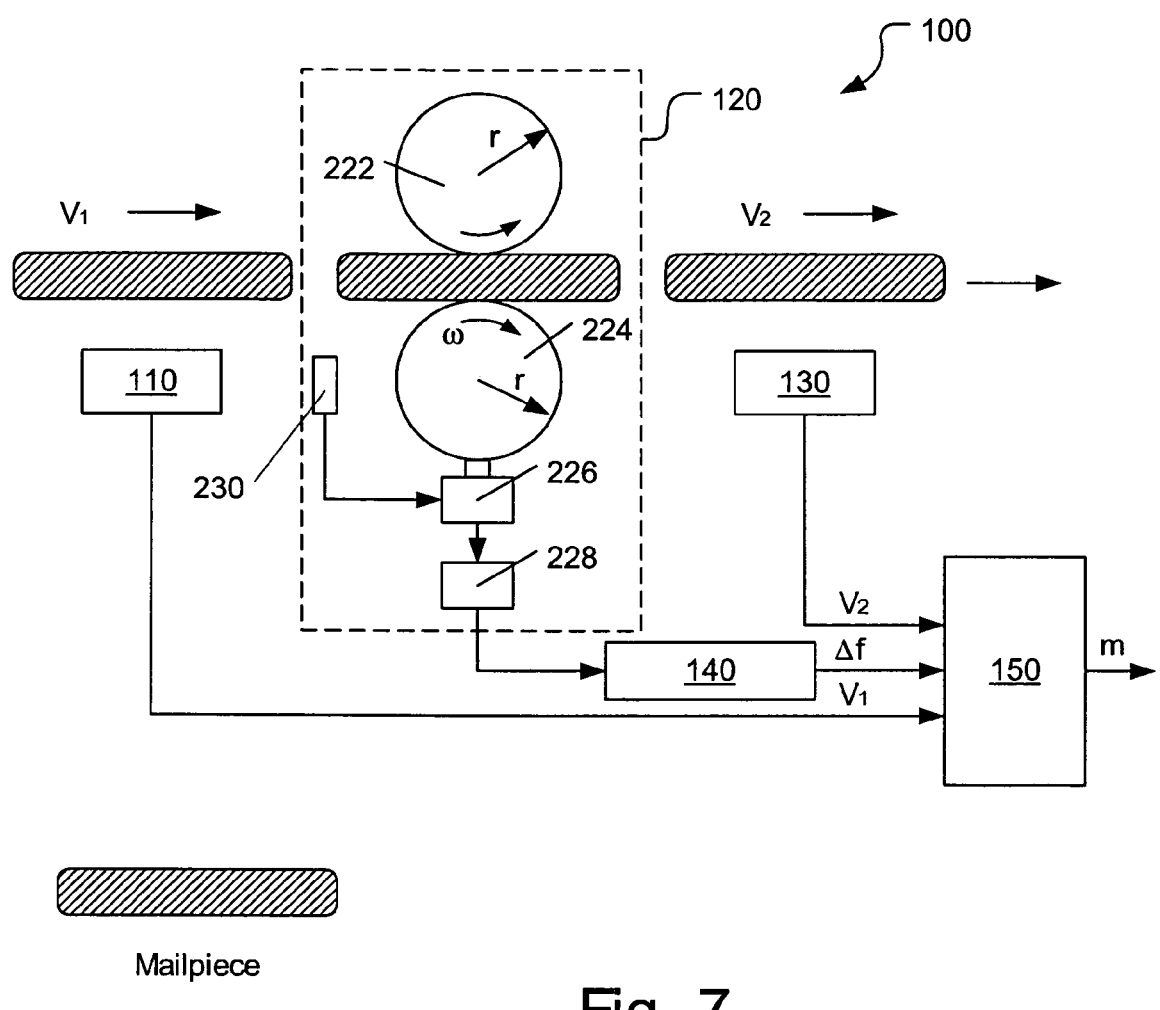
FIG. 7 is a schematic drawing of an example of modification to the first embodiment of the invention.

The first embodiment shown in FIG. 2 can be modified as shown in FIG. 7. In FIG. 7, the force imparting device 120 comprises a first roller 224, a second roller 222 and a calibrated dual-mode servomotor 226 that is coupled with the first roller 224. The first roller 224 and the second roller 222 have substantially the same dimensions and characteristics. The rollers are preferably urged toward each other so as to automatically accommodate mailpieces of different thickness. Whenever there is no mailpiece present in the gap, the first roller 224 is rotating at a constant angular velocity, powered by the servomotor 226. The servomotor 226 is capable of producing a voltage or current signal to a voltage (or current)-to-frequency converter 228 that is in communication with the $\Delta p$ measuring device 140. Also, the servomotor 226 is in communication with a photocell trigger 230.

A mailpiece having a first velocity $V_1$ is pinched between the two rollers on entry into the force imparting device 120. Once the mailpiece is free of the previous transport means, the photocell trigger 230 sends a signal to the servomotor 226 to switch it from the driving mode to an electrodynamic braking mode. In the braking mode, the servomotor 226 acts like a brake/generator, decelerating the mailpiece and the rollers and, at same time, converting the momentum of the mailpiece and the rollers into a voltage signal. The deceleration rate, and therefore the magnitude of voltage signal, is proportional to the inertial mass of the mailpiece. The voltage-to-frequency converter 228 generates a frequency f that is proportional to the input voltage signal. The measuring device 140 derives the frequency change ($\Delta f$) before and after the interaction and provides it to the weight calculating device 150. A scalar curve-fit algorithm derives the mass of the mailpiece as a function of $\Delta f$, either through heuristic modeling or through a lookup table utilizing a sliding scalar range adjusted for time and compensated for friction.

Figure 8:
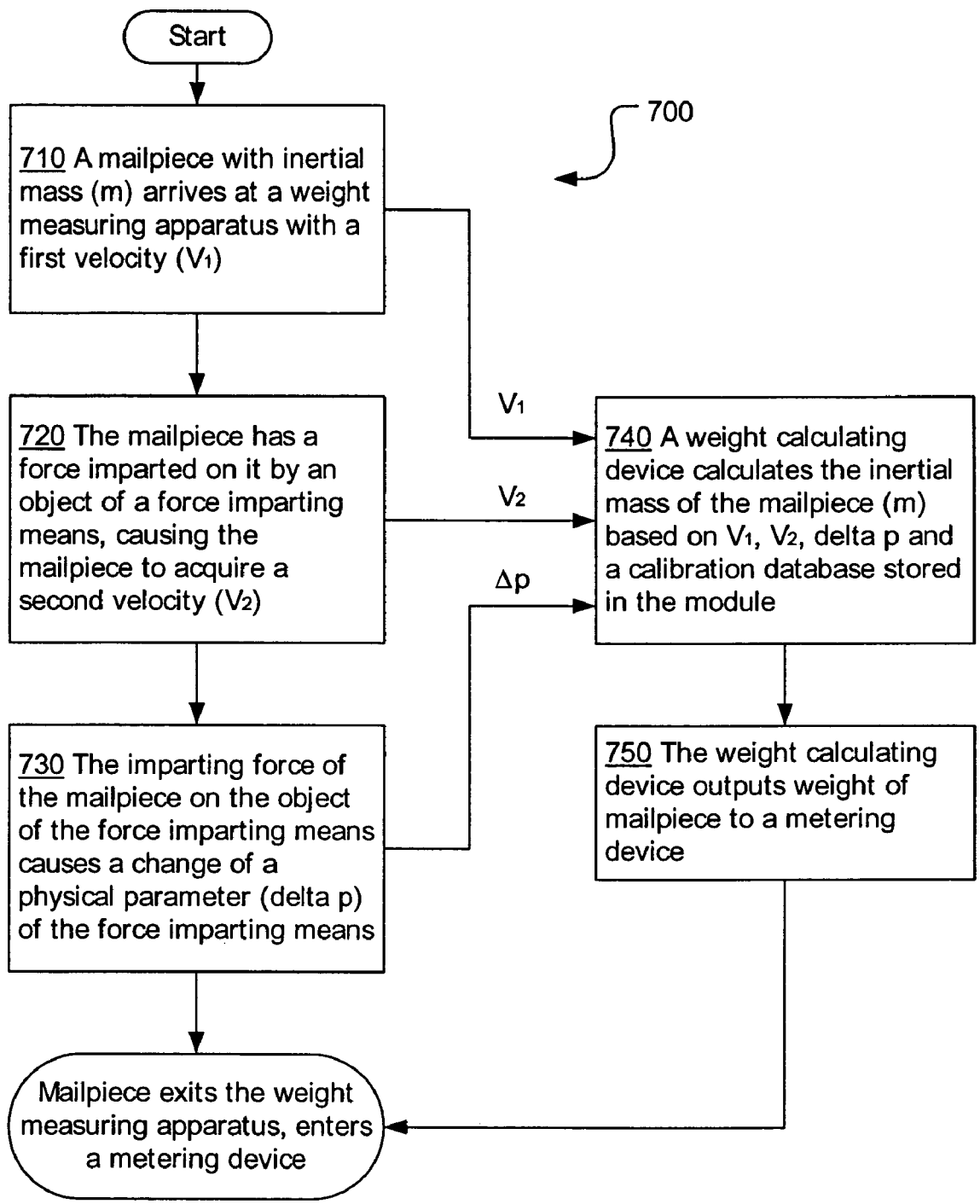
FIG. 8 is a flow diagram of the invention applicable under circumstances of normal density mail flow.

Generally, a method of measuring inertial mass of a moving object is provided by this invention. Referring now to FIG. 8, a method 700 is shown in which the inertial mass of a moving mailpiece is determined. At a first step 710, a mailpiece with inertial mass (M) arrives at a weight measuring apparatus with a first velocity ($V_1$); at a second step 720, the mailpiece has a force imparted on it by an object of a force imparting means, causing the mailpiece to acquire a second velocity ($V_2$); at a third step 730, the imparting force of the mailpiece on the object of the force imparting means causes a change of a physical parameter ($\Delta p$) of the force imparting means; at a fourth step 740, a weight calculating device calculates the inertial mass of the mailpiece (m) based on $V_1$, $V_2$, $\Delta p$ and a calibration database stored in the device; at a fifth step 750, the weight calculating device outputs the weight of the mailpiece to a metering device.

Figure 9:
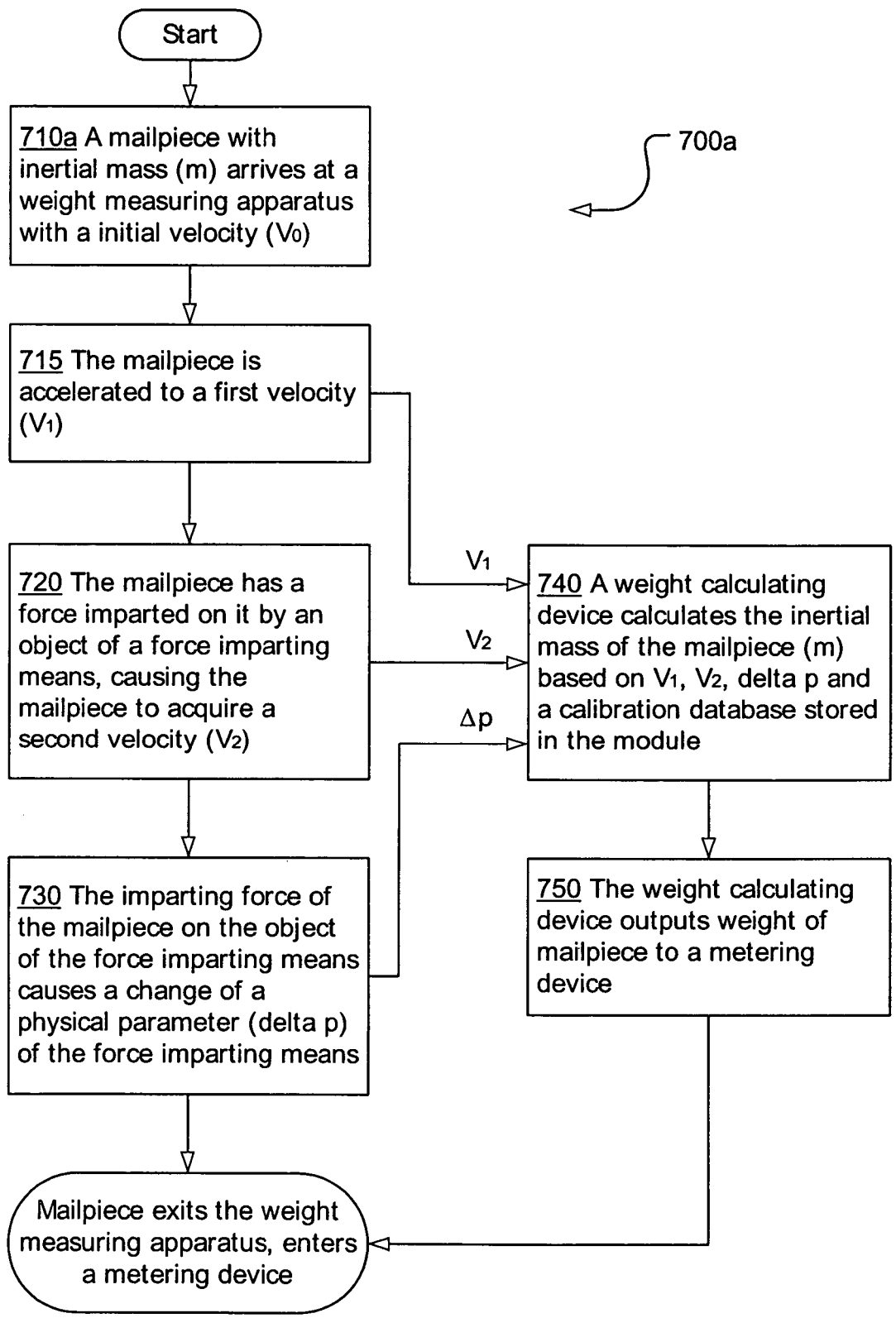
FIG. 9 is a flow diagram of the invention applicable under circumstances of high-density mail flow.

This method can be further modified to accommodate a dense mail flow. Referring now to FIG. 9, under the circumstances of high-density mail flow, a method 700a is provided in which the inertial mass of a moving mailpiece is determined. At a first step 710a, a mailpiece with inertial mass (m) arrives at a weight measure apparatus with a initial velocity ($V_0$); at a second step 715, the mailpiece is accelerated to a first velocity ($V_1$); at a third step 720, the mailpiece receives an impart of force by an object of a force imparting means, causing the mailpiece to acquire a second velocity ($V_2$); at a fourth step 730, the imparting force of the mailpiece on the object of the force imparting means causes a change of a physical parameter ($\Delta P$) of the force imparting means; at a fifth step 740, a weight calculating device calculates the inertial mass of the mailpiece (m) based on $V_1$, $V_2$, $\Delta p$ and a calibration database stored in the device; at a sixth step 750, the weight calculating device outputs the weight of the mailpiece to a metering device.

In summary, the IMOF device and method of the current invention measures the inertial mass of a target object, instead of directly measuring the weight of the object. The device and method allows for higher speed determination of target mass properties. The method can be implemented in various automated mail handling systems. The advantages of the invention, comparing to the conventional methods utilizing mechanical scales, include greater accuracy, higher throughput, increased noise and vibration immunity, ease of scalability in speed and mass, more consistent performance, lower maintenance, and potentially less expensive.

Although the invention has been illustrated with respect to exemplary embodiments thereof, numerous modifications and alternative arrangements may be devised by those skilled in the art without departing from the scope of the present invention, and the appended claims are intended to cover such modifications and arrangements. For instance, the force imparting device may be designed to increase the velocity of the mailpieces rather than to decrease its velocity.

What is claimed is:

1. A mailpiece weight measuring apparatus for use with a mailpiece processing system that transports mailpieces at an initial velocity (V0); the mailpiece weight measuring apparatus comprising:

means for determining a first velocity (V1) of a mailpiece, means for imparting a force to the mailpiece in a direction co-linear with said first velocity as it enters the mailpiece weight measuring apparatus, so that the mailpiece exits said force impacting means at a second velocity (V2);

means for determining the second velocity (V2) of the mailpiece;

means for determining a change in a parameter ($\Delta p$), said change being proportional to the force imparted to the mailpiece by said force imparting means; and means for determining the weight of the mailpiece (m) based upon the determined first velocity (V1), second velocity (V2) and the change in said parameter ($\Delta p$)

wherein the force imparting means comprises a first roller and a second roller positioned relative to each other so that a mailpiece is pinched between the rollers when it travels between them;

wherein the means for determining a change in a parameter ($\Delta p$) comprising a logical device in communication with a rotational encoder monitoring the first roller, said logical device capable of deriving a change of angular velocity of the first roller based on signals from the rotational encoder.

2. A mailpiece weight measuring apparatus for use with a mailpiece processing system that transports mailpieces at an initial velocity (V0); the mailpiece weight measuring apparatus comprising:

means for determining a first velocity (V1) of a mailpiece, means for imparting a force to the mailpiece in a direction co-linear with said first velocity as it enters the mailpiece weight measuring apparatus, so that the mailpiece exits said force impacting means at a second velocity (V2);

means for determining the second velocity (V2) of the mailpiece;

means for determining a change in a parameter ($\Delta p$), said change being proportional to the force imparted to the mailpiece by said force imparting means; and means for determining the weight of the mailpiece (m) based upon the determined first velocity (V1), second velocity (V2) and the change in said parameter ($\Delta p$).

wherein the force imparting means comprising an elongate object having a first end and a second end, said first end is pivotally fastened at a location remote from a path that the mailpieces travel, said second end is attached to a flat plate, said flat plate is positioned substantially perpendicular to the path when the elongate object is in a first position so that said plate is impacted by a mailpiece as the mailpiece travels along its path, hereby angularly displacing the elongate object from the first position.

3. The mailpiece weight measuring apparatus according to claim 2, wherein the means for determining a change in a parameter ($\Delta p$) comprising a device that is capable of determining a displacement angle ($\Delta \theta$) of the elongated object from its first position to its displaced position after said impact with the mailpiece.

4. The mailpiece weight measuring apparatus according to claim 1, further comprising means for accelerating a mailpiece from the initial velocity (V0) to the first velocity (V1).

5. The mailpiece weight apparatus according to claim 2, further comprising means for accelerating mailpiece from the initial velocity (V0) to the first velocity (V1).

* * * * *